United States Patent
Kim et al.

(10) Patent No.: US 10,070,147 B2
(45) Date of Patent: Sep. 4, 2018

(54) METHOD PREDICTING VIEW SYNTHESIS IN MULTI-VIEW VIDEO CODING AND METHOD FOR CONSTITUTING MERGE CANDIDATE LIST BY USING SAME

(71) Applicant: LG ELECTRONICS INC., Seoul (KR)

(72) Inventors: Taesup Kim, Seoul (KR); Sehoon Yea, Seoul (KR); Jin Heo, Seoul (KR); Jungdong Seo, Seoul (KR); Sunmi Yoo, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 15/028,806

(22) PCT Filed: Oct. 20, 2014

(86) PCT No.: PCT/KR2014/009861
§ 371 (c)(1),
(2) Date: Apr. 12, 2016

(87) PCT Pub. No.: WO2015/057039
PCT Pub. Date: Apr. 23, 2015

(65) Prior Publication Data
US 2016/0295240 A1    Oct. 6, 2016

Related U.S. Application Data

(60) Provisional application No. 61/892,443, filed on Oct. 18, 2013, provisional application No. 61/892,444, filed on Oct. 18, 2013.

(51) Int. Cl.
*H04N 19/597* (2014.01)
*H04N 19/176* (2014.01)
(Continued)

(52) U.S. Cl.
CPC ......... *H04N 19/597* (2014.11); *H04N 19/105* (2014.11); *H04N 19/119* (2014.11);
(Continued)

(58) Field of Classification Search
CPC ............................ H04N 19/52; H04N 19/597
(Continued)

(56) References Cited

U.S. PATENT DOCUMENTS

2005/0286757 A1    12/2005  Zitnick et al.
2013/0128965 A1    5/2013   Zhang et al.
(Continued)

FOREIGN PATENT DOCUMENTS

KR    10-2013-0061290 A    6/2013
WO    2013-068547 A2       5/2013

*Primary Examiner* — Gims S Philippe
(74) *Attorney, Agent, or Firm* — Dentons US LLP

(57) ABSTRACT

The present invention relates to a method for constituting a merge candidate list by using a view synthesis prediction (VSP) and the like in multi-view video coding. The method for constituting the merge candidate list according to the present invention comprises the steps of: determining a prediction mode for a current block; inducing, as a merge candidate, motion information from neighboring blocks of the current block when the prediction mode for the current block is a merge mode or a skip mode; and constituting the merge candidate list by using the motion information of the neighboring blocks and the deep parity information induced from the neighboring blocks of the current block.

11 Claims, 17 Drawing Sheets

(51) Int. Cl.
*H04N 19/119* (2014.01)
*H04N 19/513* (2014.01)
*H04N 19/137* (2014.01)
*H04N 19/105* (2014.01)
*H04N 19/139* (2014.01)

(52) U.S. Cl.
CPC ......... *H04N 19/137* (2014.11); *H04N 19/139* (2014.11); *H04N 19/176* (2014.11); *H04N 19/513* (2014.11); *H04N 19/521* (2014.11)

(58) Field of Classification Search
USPC .......................... 375/240.12, 240.16, 240.24
See application file for complete search history.

(56) References Cited

U.S. PATENT DOCUMENTS

| | | | |
|---|---|---|---|
| 2013/0271567 A1 | 10/2013 | Lee et al. | |
| 2015/0201215 A1* | 7/2015 | Chen .................... | H04N 19/597 348/42 |
| 2015/0201216 A1* | 7/2015 | Lin ...................... | H04N 19/597 348/42 |
| 2015/0358598 A1* | 12/2015 | Lin ...................... | H04N 19/597 375/240.16 |
| 2016/0073133 A1* | 3/2016 | Lee ........................ | H04N 19/52 375/240.12 |
| 2016/0134857 A1* | 5/2016 | An ....................... | H04N 19/597 348/43 |
| 2016/0134883 A1* | 5/2016 | Choi ................... | H04N 19/597 375/240.16 |

\* cited by examiner

Merge candidate list

Merge candidate list

METHOD PREDICTING VIEW SYNTHESIS IN MULTI-VIEW VIDEO CODING AND METHOD FOR CONSTITUTING MERGE CANDIDATE LIST BY USING SAME

This application is a National Phase Application of International Application No. PCT/KR2014/009861 filed on Oct. 20, 2014, which claims benefit of priority to U.S. Provisional Nos. 61/892,443 and 61/892,444 both filed Oct. 18, 2013, all of which is incorporated by reference for all purposes as if fully set forth herein.

TECHNICAL FIELD

The present invention relates to a video coding technique, and, more particularly, to a 3D video image coding technique.

BACKGROUND ART

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, 3D video using multi-views have a high correlation between views having the same picture order count POC. Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for encoding/decoding a multi-view video, and information need for encoding and/or decoding of a current view can be obtained. For example, a block to be decoded in a current view can be predicted or decoded with reference to a block in different view.

SUMMARY OF THE INVENTION

Technical Problems

An object of the present invention is to provide a method of deriving a merge candidate for effectively performing inter-view prediction, and a method and an apparatus for constructing a merge candidate list.

Another object of the present invention is to provide a method and an apparatus considering effective conditions for deriving each merge candidate and availability of each merge candidate in constructing a merge candidate list.

Still another object of the present invention is to provide a method and an apparatus for performing derivation of a disparity vector and prediction by sub-blocks of a current block in order to effectively decode the current block using depth information.

Technical Solution

According to an embodiment of the present invention, there is provided a method of constructing a merge candidate list in a multi-view video, the method including determining a prediction mode for a current block; deriving, as a merge candidate, motion information from neighbor blocks of the current block when the prediction mode for the current block is a merge mode or a skip mode; and constructing a merge candidate list using the motion information on the neighbor blocks and disparity information derived from a neighbor block of the current block, wherein the constructing of the merge candidate list arranges merge candidates in order of first disparity information derived from the neighbor block of the current block, motion information derived from a left block of the current block, motion information derived from an above block of the current block, motion information derived from an above right block of the current block, second disparity information derived using depth information based on the first disparity information, third disparity information derived based on view synthesis, motion information derived from a bottom left block of the current block, and motion information derived from a left above block of the current block.

According to another embodiment of the present invention, there is provided a method of decoding a multi-view video by sub-block of a current block using view synthesis prediction, the method including specifying a depth block corresponding to a current prediction block; partitioning the current prediction block into sub-blocks using depth values of four corner samples of the depth block; deriving a disparity vector by each sub-block using depth blocks corresponding to the sub-blocks; and deriving a prediction sample by the sub-block using the disparity vector.

Advantageous Effects

According to the present invention, a merge candidate for performing inter-view prediction is effectively derived and a merge candidate list is constructed using the merge candidate, thereby improving coding efficiency.

According to the present invention, a merge candidate list is constructed considering effective conditions for deriving each merge candidate and availability of each merge candidate, thereby improving effects of a merge mode or skip mode.

According to the present invention, derivation of a disparity vector and prediction are performed by sub-blocks of a current block, thereby improving effects of view synthesis prediction.

DESCRIPTION OF EMBODIMENTS

As used herein, a term "Pixel" or "pel" means a minimum unit constituting a single image. A term "Sample" may be used as a term representing a value of a specific pixel. In this connection, the sample may indicate a pixel value of a luma component and/or a pixel value of a chroma component.

As used herein, a term "Unit" means a basic unit for image processing and/or a specific position in an image. The unit may be used interchangeably with terms such as "block", "area", or the like. Generally, a M×N block refers to a set of samples or transform coefficients arranged in M columns and N rows.

Hereinafter, embodiments of the present invention will be described in details with reference to the attached drawings.

Figure 1:
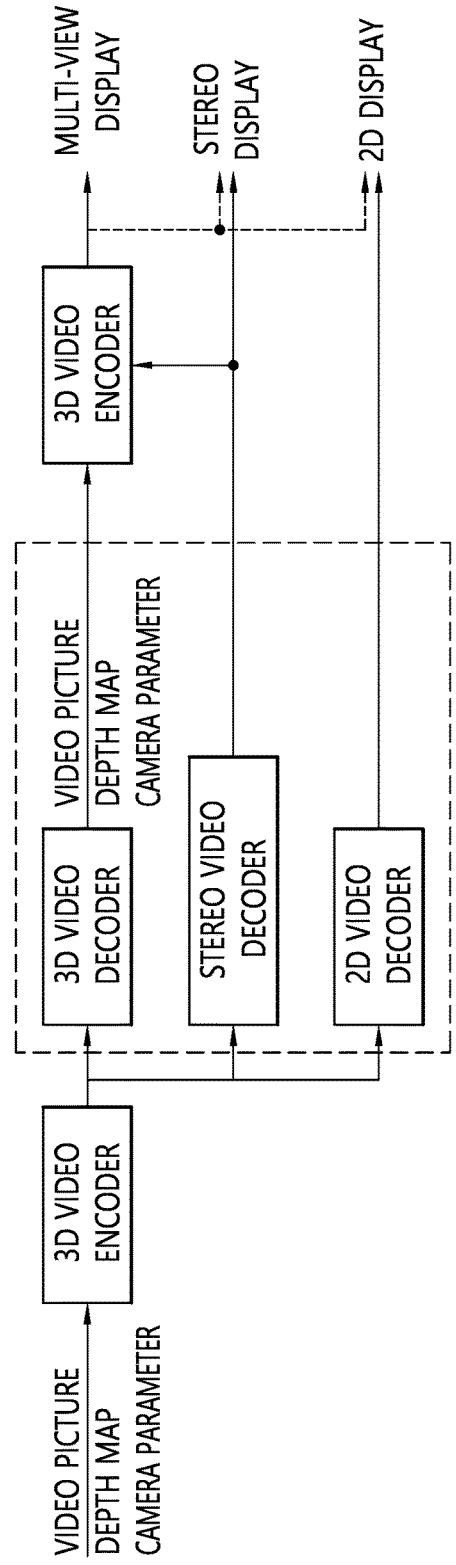
FIG. 1 is a diagram schematically describing encoding and decoding processes of a 3D video.

FIG. 1 is a diagram schematically describing encoding and decoding processes of a 3D video.

Referring to FIG. 1, a 3 video encoder encodes a video picture and a depth map and a camera parameter to output the same as a bitstream.

The depth map may be constituted by distance information (depth information) between a camera and a subject with respect to a pixel of the corresponding video picture (texture picture). For example, the depth map may be a picture acquired by normalizing the depth information according to a bit depth. In this case, the depth map may be constituted by the depth information recorded without expression of a chrominance.

In general, since a distance from the subject and a disparity are in inverse proportion to each other, disparity information indicating a correlation between views may be induced from the depth information of the depth map by using the camera parameter.

A bitstream including the depth map and camera information together with a general color picture, that is, the video picture (texture picture) may be transmitted to a decoder through a network or a storage medium.

The decoder receives the bitstream to reconstruct the video. When a 3D video decoder is used as the decoder, the 3D video decoder may decode the video picture, and the depth map and the camera parameter from the bitstream. Views required for a multi-view display may be synthesized based on the decoded video picture, depth map, and camera parameter. In this case, when the used display is a stereo display, the 3D picture may be displayed by using two pictures among the reconstructed multi-views.

When the stereo video decoder is used, the stereo video decoder may reconstruct two pictures to be incident in both eyes from the bitstream. The stereo display may display a 3D picture by using a view difference or disparity between a left picture incident in a left eye and a right picture incident in a right eye. When the multi-view display is used together with the stereo video decoder, the multi-views may be displayed by generating other views based on the two reconstructed pictures.

When a 2D decoder is used, a 2D picture is reconstructed to output the picture through a 2D display. The 2D display is used, but when the 3D video decoder or the stereo video decoder is used as the decoder, one of the reconstructed pictures may be output through the 2D display.

In the configuration of FIG. 1, the view synthesis may be performed by the decoder or the display. Further, the decoder and the display may be one apparatus or separate apparatuses.

In FIG. 1, for easy description, it is described that the 3D video decoder, the stereo video decoder, and the 2D video decoder are separate decoders, but one decoding apparatus may perform all 3D video decoding, stereo video decoding, and 2D video decoding. Further, a 3D video decoding apparatus may perform the 3D video decoding, a stereo video decoding apparatus may perform the stereo video decoding, and a 2D video decoding apparatus may perform the 2D video decoding. Furthermore, the multi-view display may output a 2D video or a stereo video.

Figure 2:
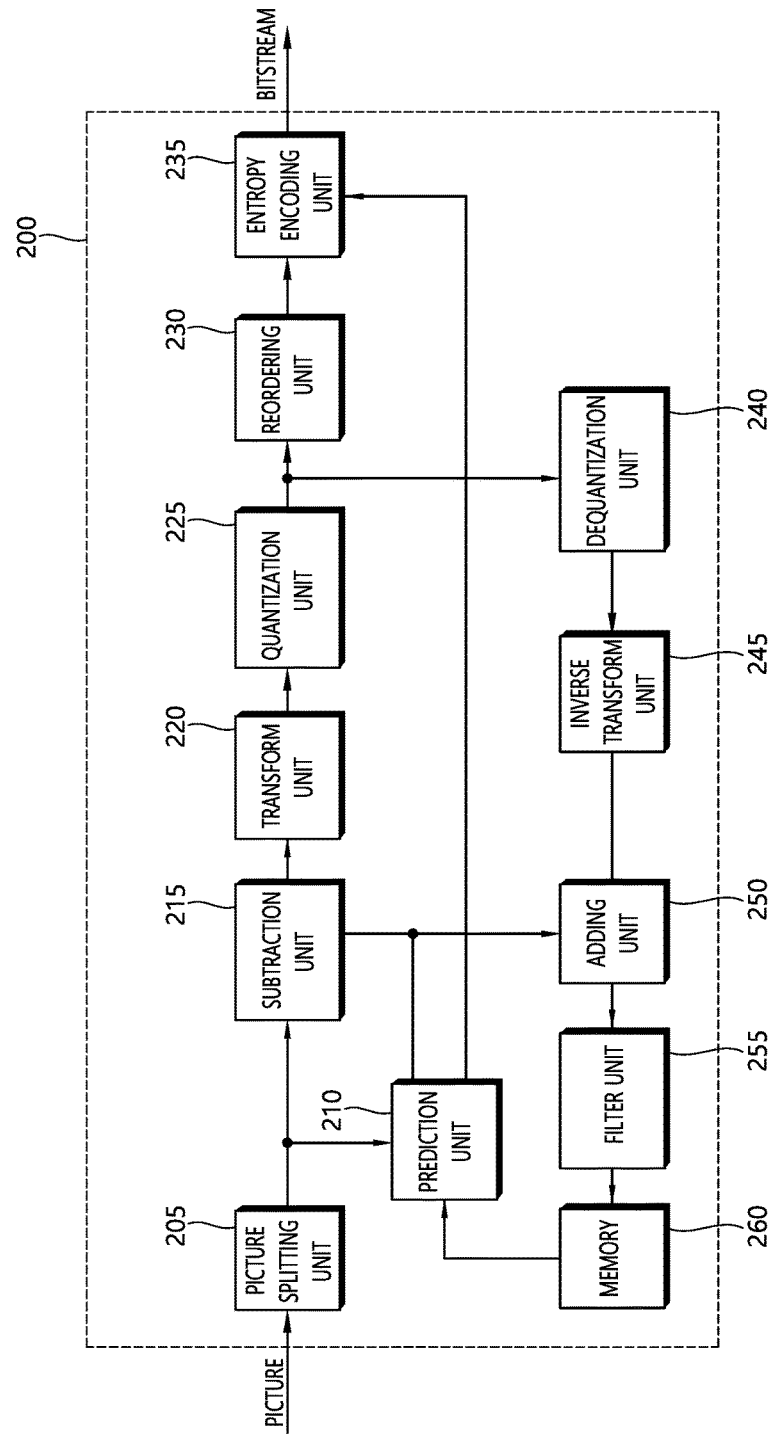
FIG. 2 is a diagram schematically describing a configuration of a video encoding apparatus.

FIG. 2 is a diagram schematically describing a configuration of a video encoding apparatus. Referring to FIG. 2, the video encoding apparatus 200 includes a picture splitting unit 205, a prediction unit 210, a subtraction unit 215, a transform unit 220, a quantization unit 225, a reordering unit 230, an entropy encoding unit 235, a dequantization unit 240, an inverse transform unit 245, an adding unit 250, a filter unit 255, and a memory 260.

The picture splitting unit 05 may split an input picture into at least one processing unit block. In this case, the processing unit block may be a coding unit block, a prediction unit block, or a transform unit block. The coding unit block as a unit block of coding may be split from a maximum coding unit block according to a quad tree structure. The prediction unit block as a block partitioned from the coding unit block may be a unit block of sample prediction. In this case, the prediction unit block may be divided into sub blocks. The transform unit bock as the coding unit block may be split according to the quad tree structure and may be a unit block to induce a transform coefficient or a unit block to induce a residual signal from the transform coefficient.

As used herein, for the sake of convenience of illustration, a coding unit block is referred to as a coding block or a coding unit (CU). A prediction unit block is referred to as a prediction block or a prediction unit (PU). A transform unit block is referred to as a transform block or a transform unit (TU).

The prediction block or the prediction unit may mean a block-shape specific area or an array of the prediction sample. Further, the transformation block or the transform unit may mean the block-shape specific area or an array of the transform coefficient or a residual sample.

The prediction unit 210 may perform a prediction for a processing target block (hereinafter, referred to as a current block) and generate the prediction block including prediction samples for the current block. A unit of the prediction performed by the prediction unit 210 may be the coding block, the transformation block, or the prediction block.

The prediction unit 210 may decide whether an intra prediction is applied to the current block or whether an inter prediction is applied to the current block.

In the case of the intra prediction, the prediction unit 210 may induce the prediction sample for the current block based on a neighbor block pixel in a picture (hereinafter, a current picture) to which the current block belongs. In this case, the prediction unit 210 may (i) induce the prediction sample based an average or an interpolation of neighbor reference samples of the current block or (ii) induce the prediction sample based on a reference sample which is present in a specific direction with respect to a prediction target pixel among neighbor blocks of the current block. For easy description, the case of (i) is referred to as a non-directional mode and the case of (ii) is referred to as a directional mode. The prediction unit 210 may decide a prediction mode applied to the current block by using the prediction mode applied to the neighbor block.

In the case of the inter prediction, the prediction unit 210 may induce the prediction sample for the current block based on samples specified by a motion vector on a collocated picture. The prediction unit 10 applies any one of a skip mode, a merge mode, and an MVP mode to induce the prediction sample for the current block. In the cases of the skip mode and the merge mode, the prediction unit 210 may use motion information of the neighbor block as the motion information of the current block. In the case of the skip mode, a difference (residual) between the prediction sample and an original sample is not transmitted unlike the merge mode. In the case of the MVP mode, the motion vector of the neighbor block is used as a motion vector predictor (MVP) to induce the motion vector of the current block.

In the case of the inter prediction, the neighbor block includes a spatial neighbor block which is present in the current picture and a spatial neighbor block which is present in the collocated picture. The motion information includes the motion vector and the collocated picture. In the skip mode and the merge mode, when the motion information of the spatial neighbor block is used, a highest picture on a collocated picture list may be used as the collocated picture.

In the case of encoding a dependent view, the prediction unit 210 may perform an inter-view prediction.

The prediction unit 210 may configure the collocated picture list including a picture of another view. For the inter-view prediction, the prediction unit 210 may induce a disparity vector. Unlike a motion vector specifying a block corresponding to the current block in another picture in a current view, the disparity vector may specify a block corresponding to the current block in another view of the same access unit as the current picture.

The prediction unit 210 may specify a depth block in a depth view based on the disparity vector and perform a configuration of a merge list, an inter-view motion prediction, an illumination compensation (IC), view synthesis, and the like.

The disparity vector for the current block may be induced from a depth value by using the camera parameter or induced from the motion vector or disparity vector of the neighbor block in the current or another view.

For example, the prediction unit 210 may add to a merge candidate list an inter-view merging candidate (IvMC) corresponding to spatial motion information of a reference view, an inter-view disparity vector candidate (IvDC) corresponding to the disparity vector, a shifted IvMC induced by a shift of the disparity, a texture merging candidate (T) induced from a texture corresponding to a case in which the current block is a block on the depth map, a disparity derived merging candidate (D) derived from the texture merging candidate by using the disparity, a view synthesis prediction merge candidate (VSP) derived based on the view synthesis, and the like.

In this case, the number of candidates included in a merge candidate list applied to the dependent view may be limited to a predetermined value.

Further, the prediction unit 210 may predict the motion vector of the current block based on the disparity vector by applying the inter-view motion vector prediction. In this case, the prediction unit 210 may derive the disparity vector based on conversion of a maximum depth value in the corresponding depth block. When a position of the reference sample in the reference view is specified by adding the disparity vector to a sample position of the current block in the reference view, a block including the reference sample may be used as the reference block. The prediction unit 210 may use the motion vector of the reference block as a candidate motion parameter or a motion vector predictor candidate of the current block and use the disparity vector as a candidate disparity vector for a disparity-compensated prediction (DCP).

The subtraction unit 215 generates the residual sample which is the difference between the original sample and the prediction sample. When the skip mode is applied, the subtraction unit 215 may not generate the residual sample as described above.

The transform unit 210 generates the transform coefficient by using transforming the residual sample by the unit of the transform block. The quantization unit 225 quantizes the transform coefficients to generate quantized transform coefficients.

The reordering unit 230 reorders the quantized transform coefficients. The reordering unit 230 may reorder the block-shape quantized transform coefficients in a 1D vector shape through a scanning method.

The entropy encoding unit 235 may perform entropy-encoding of the quantized transform coefficients. As the entropy encoding, encoding methods including, for example, exponential Golomb, context-adaptive variable length coding (CAVLC), context-adaptive binary arithmetic coding (CABAC), and the like may be used. The entropy encoding unit 235 may encode information (e.g., a value of a syntax element, and the like) required for video reconstruction together or separately in addition to the quantized transform coefficients.

The entropy-encoded information may be transmitted or stored by the unit of a network abstraction layer as the form of the bitstream.

The dequantization unit 240 dequantizes the quantized transform coefficient to generate the transform coefficient. The inverse transform unit 245 inversely transforms the transform coefficient to generate the residual sample.

The adding unit 250 adds the residual sample and the prediction sample to reconstruct the picture. The residual sample and the prediction sample are added to each other by the unit of the block to generate a reconstruction block. Herein, the adding unit 250 is described as a separate component, but the adding unit 250 may be a part of the prediction unit 210.

The filter unit 255 may apply a deblocking filter and/or offset to the reconstructed picture. Distortion during an artifact or a quantization process of a block boundary in the reconstructed picture may be corrected through the deblocking filtering and/or offset. The offset may be applied by the unit of the sample and applied after the process of the deblocking filtering is completed.

The memory 260 may store the reconstructed picture or information required for encoding/decoding. For example, the memory 60 may store pictures used for the inter prediction/inter-view prediction. In this case, the pictures used for the inter prediction/inter-view prediction may be designated by a collocated picture set or a collocated picture list.

Herein, it is described that one encoding apparatus encodes an independent view or the dependent view, but this is for easy description and a separate encoding apparatus is configured for each view or a separate internal module (for example, a prediction unit for each view) may be configured for each view.

Figure 3:
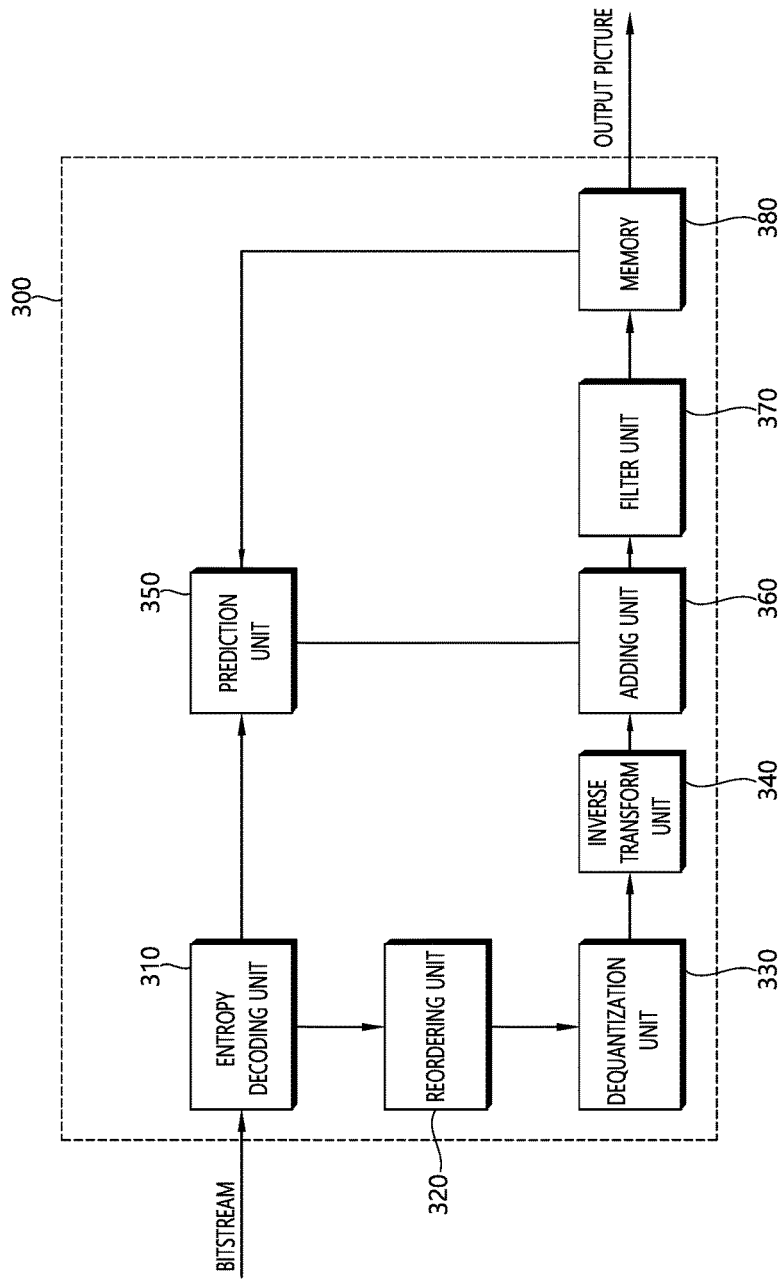
FIG. 3 is a diagram schematically describing a configuration of a video decoding apparatus.

FIG. 3 is a diagram schematically describing a configuration of a video decoding apparatus. Referring to FIG. 3, the video decoding apparatus 300 includes an entropy decoding unit 310, a reordering unit 320, a dequantization unit 330, an inverse transform unit 340, a prediction unit 350, an adding unit 360, a filter unit 370, and a memory 380.

When a bitstream including video information is input, the video decoding apparatus 300 may reconstruct a video to correspond to a process in which the video information is processed by the video encoding apparatus.

For example, the video decoding apparatus 300 may perform video decoding by using the processing unit applied in the video encoding apparatus. In this case, the processing unit block of the video decoding may be the coding unit block, the prediction unit block, or the transform unit block. The coding unit block as a unit block of decoding may be split from the maximum coding unit block according to the quad tree structure. The prediction unit block as the block partitioned from the coding unit block may be the unit block of sample prediction. In this case, the prediction unit block may be divided into sub blocks. The transform unit bock as the coding unit block may be split according to the quad tree structure and may be a unit block to derive a transform coefficient or a unit block to derive a residual signal from the transform coefficient.

The entropy decoding module 310 may parse a bitstream and output information required to recover a video or picture. For example, the entropy decoding module 310 may decode information in the bitstream based on an expotential-Golomb, CAVLC, CABAC, etc., and output a syntax element value for video recovery, a quantized value of a transform coefficient for a residual.

When a plurality of views is processed in order to reproduce the 3D video, the bitstream may be input for each view. Alternatively, information on the respective views may be multiplexed in the bitstream. In this case, the entropy decoding unit 310 de-multiplexes the bitstream to parse the de-multiplexed bitstream for each view.

The reordering unit 320 may reorder the quantized transform coefficients in the 2D block form. The reordering unit 320 may perform reordering to correspond to coefficient scanning performed by the encoding apparatus.

The dequantization unit 330 dequantizes the quantized transform coefficients based on (de)quantized parameters to output the transform coefficients. Information for deriving the quantized parameters may be signaled from the encoding apparatus.

The inverse transform unit 340 inversely transforms the transform coefficients to derive the residual samples.

The prediction unit 350 may perform a prediction for the current block and generate the prediction block including prediction samples for the current block. A unit of the prediction performed by the prediction unit 350 may be the coding block, the transformation block, or the prediction block.

The prediction unit 350 may decide whether the intra prediction is applied to the current block or whether the inter prediction is applied to the current block. In this case, a unit for deciding which the intra prediction or the inter prediction is applied and a unit for generating the prediction sample may be different from each other. Moreover, the units for generating the prediction sample in the inter prediction and the intra prediction may also be different from each other.

In the case of the intra prediction, the prediction unit 350 may derive the prediction sample for the current block based on the neighbor block pixel in the current picture. The prediction unit 350 may derive the prediction sample for the current block by applying the directional mode or the non-directional mode based on neighbor reference blocks of the current block. In this case, the prediction mode to be applied to the current block may be decided by using an intra prediction mode of the neighbor block.

In the case of the inter prediction, the prediction unit 350 may derive the prediction sample for the current block based on the samples specified by the motion vector on the collocated picture. The prediction unit 10 applies any one of the skip mode, the merge mode, and the MVP mode to derive the prediction sample for the current block.

In the cases of the skip mode and the merge mode, the prediction unit 350 may use the motion information of the neighbor block as the motion information of the current block. In this case, the neighbor block may include a spatial neighbor block and a temporal neighbor block.

The prediction unit 350 may configure the merge candidate list as motion information of an available neighbor block and information indicated by a merge index on the merge candidate list may be used as the motion vector of the current block. The merge index may be signaled from the encoding apparatus. The motion information includes the motion vector and the collocated picture. In the skip mode and the merge mode, when the motion information of the temporal neighbor block is used, the highest picture on the collocated picture list may be used as the collocated picture.

In the case of the skip mode, the difference (residual) between the prediction sample and the original sample is not transmitted unlike the merge mode.

In the case of the MVP mode, the motion vector of the neighbor block is used as the motion vector predictor (MVP) to derive the motion vector of the current block. In this case, the neighbor block may include the spatial neighbor block and the temporal neighbor block.

In the case of encoding the dependent view, the prediction unit 350 may perform the inter-view prediction. In this case, the prediction unit 350 may configure the collocated picture list including the picture of another view.

For the inter-view prediction, the prediction unit 350 may derive the disparity vector. The prediction unit 350 may specify the depth block in the depth view based on the disparity vector and perform the configuration of the merge list, the inter-view motion prediction, the illumination compensation (IC), the view synthesis, and the like.

The disparity vector for the current block may be derived from the depth value by using the camera parameter or derived from the motion vector or disparity vector of the neighbor block in the current or another view. The camera parameter may be signaled from the encoding apparatus.

When the merge mode is applied to the current block of the dependent view, the prediction unit 350 may add to the merge candidate list IvDC corresponding to the temporal motion information of the reference view, IvDC corresponding to the disparity vector, shift IvMC derived by the shift of the disparity vector, the texture merge candidate (T), derived from the texture corresponding to the case in which the current block is the block on the depth map, the disparity derive merge candidate (D) derived from the texture merge candidate by using the disparity, the view synthesis prediction merge candidate (VSP) derived based on the view synthesis, and the like.

In this case, the number of candidates included in the merge candidate list applied to the dependent view may be limited to a predetermined value.

Further, the prediction unit 350 may predict the motion vector of the current block based on the disparity vector by applying the inter-view motion vector prediction. In this case, the prediction unit 350 may use the block in the reference view specified by the disparity vector as the reference block. The prediction unit 350 may use the motion vector of the reference block as the candidate motion parameter or the motion vector predictor candidate of the current block and use the disparity vector as the candidate disparity vector for the DCP.

The adding unit 360 adds the residual sample and the prediction sample to reconstruct the current block or the current picture. The adding unit 360 adds the residual sample and the prediction sample by the unit of the block to reconstruct the current picture. When the skip mode is applied, since the residual is not transmitted, the prediction sample may become a reconstruction sample. Herein, the adding unit 360 is described as a separate component, but the adding unit 360 may be a part of the prediction unit 350.

The filter unit 370 may apply the deblocking filtering and/or offset to the reconstructed picture. In this case, the offset may be adaptively applied as the offset of the sample unit.

The memory 380 may store the reconstructed picture or information required for decoding. For example, the memory 380 may store pictures used for the inter prediction/inter-view prediction. In this case, the pictures used for the inter prediction/inter-view prediction may be designated by the collocated picture set or the collocated picture list. The reconstructed picture may be used as the collocated picture.

Further, the memory 380 may output the reconstructed pictures according to an output order. In order to reproduce the 3D picture, although not illustrated, an output unit may display a plurality of different views.

In the example of FIG. 3, it is described that one decoding apparatus decodes the independent view and the dependent view, but this is for easy description and the present invention is not limited thereto. For example, each decoding apparatus may operate for each view and one decoding apparatus may include an operating unit (for example, a prediction unit) corresponding to each view therein.

When coding a multi-view video, encoding and decoding devices may improve efficiency of video coding for a current view, using coded data for different view belonging to the same access unit (AU) as a current picture. In this connection, pictures having an equal POC (Picture Order Count) may define a single AU. The POC refers to a display order of a certain picture.

The encoding and decoding devices may code views on an AU unit basis, and/or may code pictures on a view unit basis. The coding may proceed for the views based on a predetermined order. A view to be coded first may be referred to as a base view or independent view. A view to be coded with reference to different view after coding the independent view may be referred to as a dependent view. Further, when a current view is a dependent view, different view to be referenced for coding (encoding/decoding) of the current may be referred to as a reference view.

Figure 4:
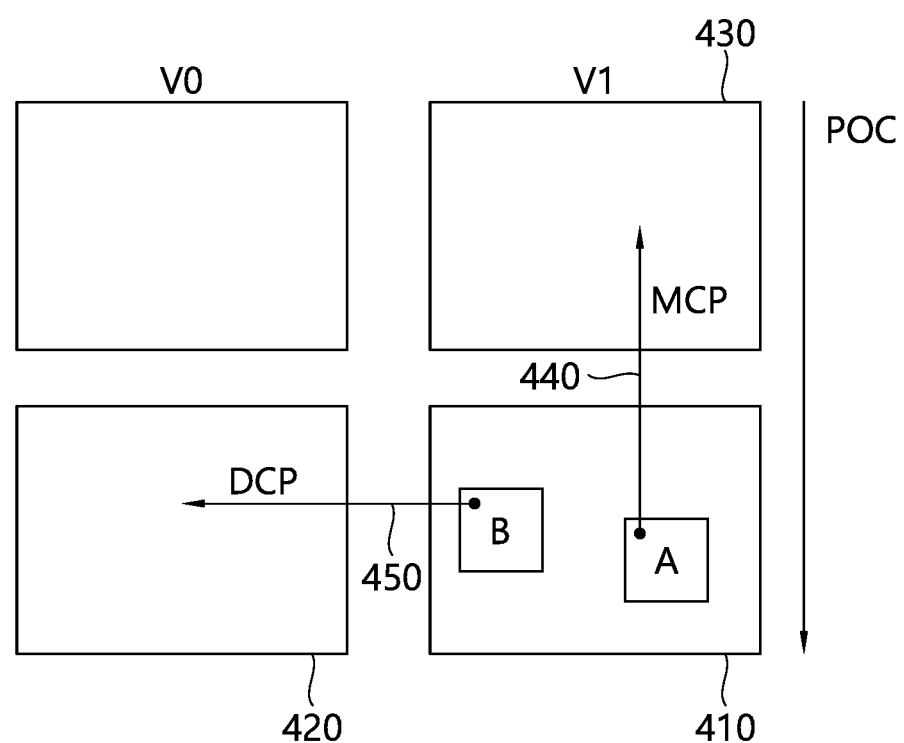
FIG. 4 schematically illustrates an inter-view coding method.

FIG. 4 schematically illustrates an inter-view coding method. In an example of FIG. 4, coding is performed on an AU unit basis, and V0 is an independent view, and V1 is a dependent view. Inter picture prediction may be carried out, for example, for a block A in a current picture 410 with reference to another picture 430 in the same view as the current picture 410 by using a motion vector. Such inter picture prediction may be referred to as motion-compensated prediction (MCP). In an alternative, inter picture prediction may be carried out, for example, for a block B in the current picture 410 with reference to a picture 420 in a different view from the current picture 410 but existing in the same access unit, that is, having the same POC as the current picture 410 by using a disparity vector. Such inter picture prediction may be referred to as disparity-compensated prediction (DCP).

When coding a multi-view video, the inter picture prediction may employ a depth map besides the picture in the different view from the current view containing the current block.

Figure 5:
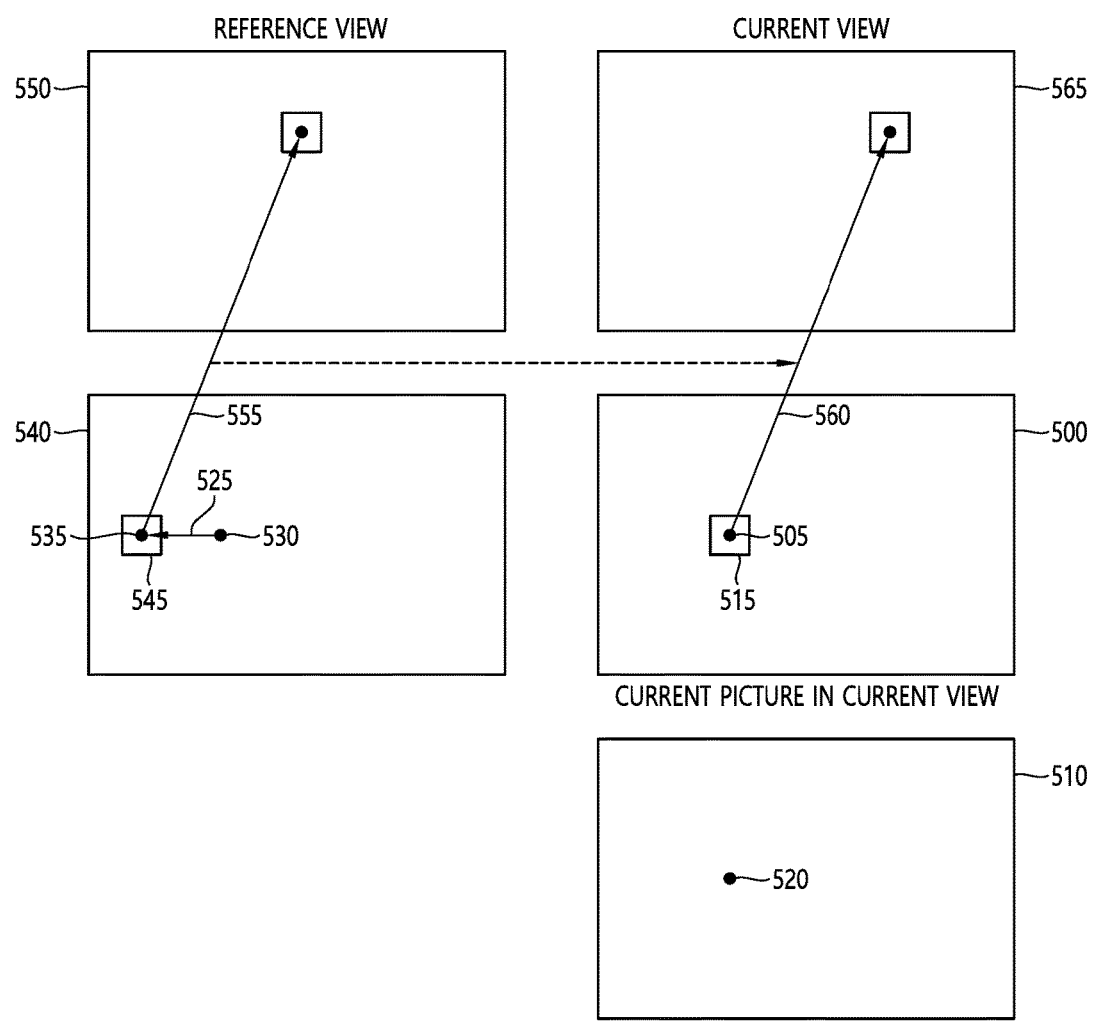
FIG. 5 schematically illustrates a multi-view coding method using a depth map.

FIG. 5 schematically illustrates a multi-view coding method using a depth map.

Referring to FIG. 5, a block (current block 505) in a current picture 500 in a current view may be coded (encoded/decoded) using a depth map 510. In this connection, a depth value d for a position (x, y) of a sample 520 in the depth map 510 corresponding to a position (x, y) of a sample 515 in the current block 505 may be transformed to a disparity vector 525. The depth value d may be derived based on a distance between the sample pixel and a camera.

Encoding and decoding devices may add a disparity vector 525 to the position (x, y) of the sample 530, thereby to determine a position of a reference sample 535 in a current picture 540 in a reference view. The disparity vector may have only a x axial component. Therefore, the disparity vector value may be a value (disp, 0). Thus, the position (xr, y) of the reference sample 540 may be determined to be a position (x+disp, y).

Encoding and decoding devices may employ a motion parameter for the reference block 545 including a reference pixel 535 as a candidate motion parameter for the current block. For example, when a reference picture 550 in the reference view is a reference picture for the reference block 545, the motion vector 555 for the reference block 545 may be derived from a motion vector 560 for the current block 505. In this connection, a picture 565 may be a reference picture in the current view.

Meanwhile, as described above, in decoding a multi-view video, information on a different view may be referenced using a disparity vector.

In coding (encoding/decoding) a picture of a dependent view, when there is a DCP-coded block among already coded neighbor blocks, a disparity vector of the DCP-coded block may be used as a disparity vector to be applied to a current block. Here, the disparity vector derived from the neighbor block, that is, the disparity vector of the DCP-coded block, may be used as a disparity vector for applying inter-view motion prediction (IVMP) and inter-view residual prediction (IVRP) to the current block.

First, a case where a motion vector of the current block is determined by IVMP will be described. When a candidate derived from a motion vector of a corresponding block in an inter-view reference picture is selected as a motion vector applied to the current block in a motion vector prediction (MVP) mode, an advanced motion vector prediction (AMVP) mode, a merge mode, or a skip mode, the current block is coded by MCP.

A block with a motion vector predicted by IVMP among MCP-coded blocks is referred to as a DV-MCP block.

Figure 6:
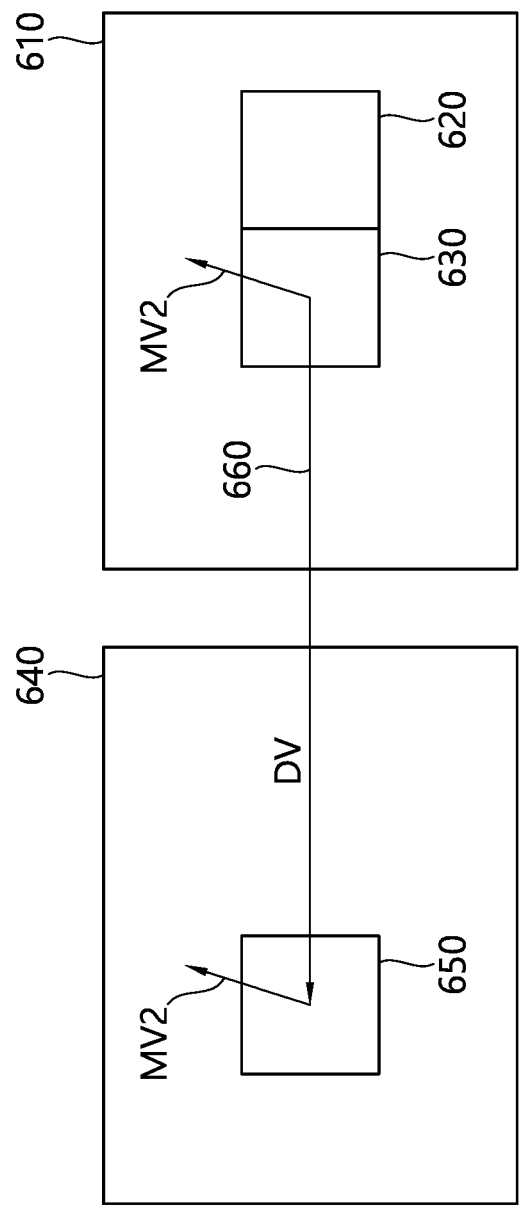
FIG. 6 schematically illustrates a disparity vector-motion compensated prediction (DV-MCP) block.

FIG. 6 schematically illustrates a DV-MCP block. FIG. 6 illustrates inter-prediction of a current block 620 in a current picture 610 of a current view.

Referring to FIG. 6, a motion vector MV1 of a neighbor block 630 used for inter-prediction of the current block 620 is derived from a corresponding block 650 of a reference picture 640 in a base view. Here, the corresponding block is specified by a disparity vector DV 660. The motion vector MV1 of the neighbor block 630, used as a candidate block for inter prediction of the current block 620, may be configured with a motion vector MV2 of the corresponding block 650 or derived from MV2.

Here, the reference picture 640 in the base view and the current picture 610 may have the same POC. The neighbor block 630, to which the motion vector MV1 predicted from the motion vector MV2 of the corresponding block 650 in a different view is applied, may be referred to as a DV-MCP block.

Encoding and decoding devices may store information on the disparity vector used for prediction of the motion vector of the DV-MCP block to utilize the information for a process of deriving a disparity vector of a neighbor block.

Figure 7:
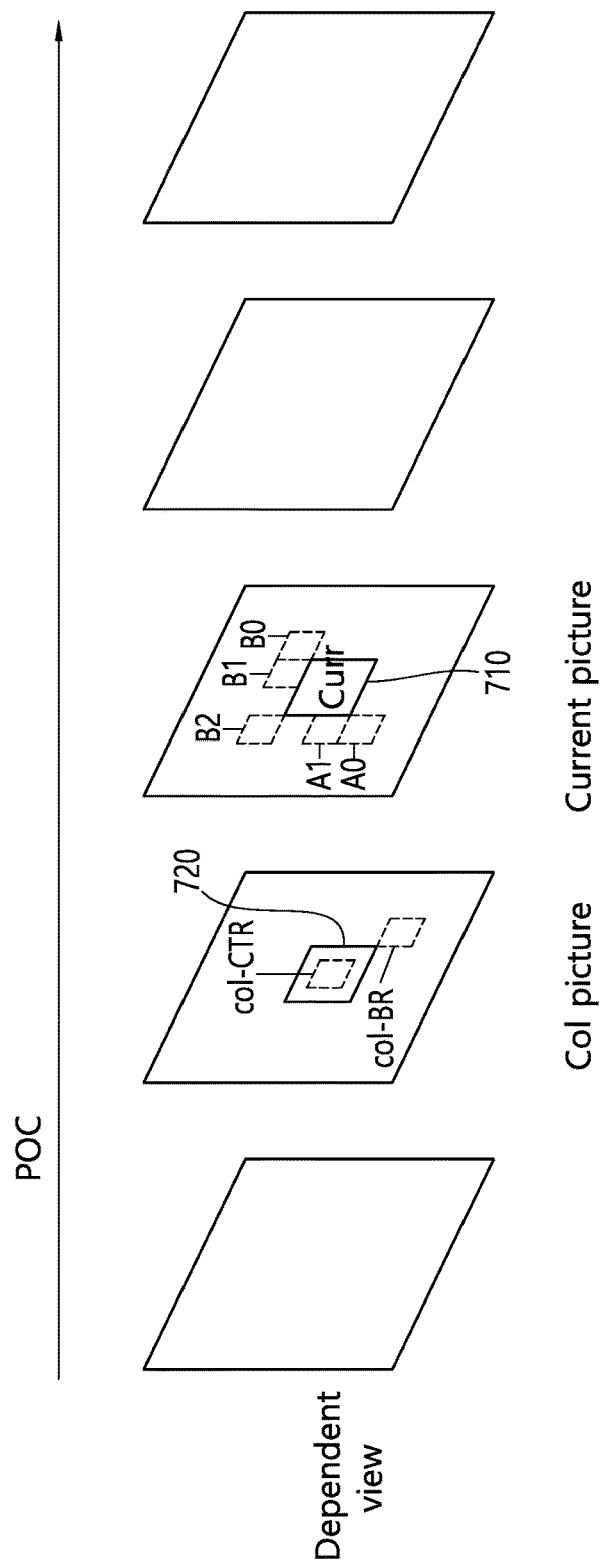
FIG. 7 schematically illustrates an example of neighbor blocks of a current block.

FIG. 7 schematically illustrates an example of neighbor blocks of a current block. The neighbor blocks in FIG. 7 are blocks which have already decoded and are accessible at a time when the current block is decoded.

The neighbor blocks of the current block 710 include spatial neighbor blocks A0, A1, B0, B1, and B2 and temporal neighbor blocks col-center (col-CTR) and col-right bottom (col-RB). Positions of the spatial neighbor blocks are specified based on a position of the current block 710.

Positions of the temporal neighbor blocks are specified based on a position 720 corresponding to the current block in a collocated picture as one reference picture. Among the temporal blocks, a coding block including a pixel located at a center of a current block 720 in a collocated picture designated at a time when a current picture or a current slice is decoded is col-CTR. Further, when a bottom right pixel of the current block 720 in the collocated picture is located at (x, y), a coding block including a pixel at a (x+1, y+1) is col-RB. In this specification, for convenience, col-CTR is also represented by CTR, and col-BR by BR hereinafter.

The collocated picture may be one selected for temporal disparity vector derivation among temporal reference pictures included in a reference picture list for a current picture or current slice.

The collocated picture may be indicated to a decoder through a slice header. For example, information indicating which picture is used as a collocated picture may be signaled in a slice header.

Meanwhile, in reconstructing the current block using inter-view prediction, when the merge mode is applied to the current block, a prediction sample may be derived by prediction block (PU) or sub-prediction block (sub-PU).

For example, when a current prediction block is in a texture and the current slice includes at least one inter-view reference block, prediction units of encoding and decoding devices may specify a block corresponding to the current block based on a disparity vector and derive a prediction sample in a PU level or sub-PU level using the corresponding block.

When prediction using the merge mode is applied to the current block in decoding the multi-view video, the prediction units of the encoding and decoding devices may construct a merge candidate list in the same method as for the base view and add, to the merge candidate list, an inter-view merge candidate (IvMC) using a motion vector of a corresponding block in a reference view, an inter-view disparity vector candidate (IvDC) using a disparity vector of a corresponding block in a reference view, a shifted IvMC and a shifted IvDC respectively acquired by shifting the IvMC and the IvDC, and a view synthesis prediction (VSP) merge candidate derived based on a depth.

Hereinafter, the merge candidates in the merge candidate list will be schematically described.

First, available motion vectors are derived from spatial neighbor blocks in the same manner as for a merge candidate list used for the base view. Here, the spatial neighbor blocks of the current block are neighbor blocks of the current block 710 in FIG. 7, A0, A1, B0, B1, and B2.

Further, information on a corresponding block in a different reference view from the current view may be used as a merge candidate for the current block. The corresponding block may be specified by a disparity vector. The disparity vector may be derived from a disparity vector or motion vector of a DCP or MCP-applied neighbor block or be a value obtained by modifying the derived motion vector using a depth map. For convenience, a disparity vector derived from a neighbor block is referred to as a neighbor block disparity vector (NBDV), and a disparity vector derived from an NBDV using a depth value is referred to as a depth-oriented NBDV (DoNBDV).

The prediction units of the encoding and decoding devices may use, as an inter-view merge candidate (IvMC), a motion vector used for temporal motion compensation of a reference block in a reference view specified by a disparity vector. That is, a motion vector of an MCP-applied block in the reference view may be used as a motion vector candidate of the current block. Here, the disparity vector used to specify the reference block may be an NBDV or DoNBDV derived based on a neighbor block of the current block or be a value derived based on a depth map. Meanwhile, a derivation method in a PU level or sub-PU level may be used to derive an IvMC.

The prediction units of the encoding and decoding devices may use a disparity vector of a corresponding block in the reference view as an inter-view disparity vector candidate (IvDC).

The prediction units of the encoding and decoding devices may shift the disparity vector by a specific value to derive a motion vector of the corresponding block specified by the shifted disparity vector as a shifted IvMC (IvMCShift). The prediction units may shift the disparity vector using a height and width of the current prediction block. For example, when the height of the current block is nPbH and the width of the current block is nPbW, the prediction units may shift the disparity vector by nPbW*2+2 in an x-axis direction and by nPbH*2+2 in a y-axis direction to derive an IvMCShift.

When the IvMC and the IvMCShift are not the same, the prediction units may add the IvMCShift as a merge candidate for the current block.

The prediction units of the encoding and decoding devices may shift the disparity vector by a specific value to add the shifted IvDC (IvDCShift) as a merge candidate for the current block. For example, the prediction units may use a disparity vector, obtained by shifting the IvDC by a predetermined distance (for example, 4) only in the x-axis, as an IvDCShift. Further, the prediction units may derive the IvDCShift considering that VSP is applied. For example, when VSP is available, the prediction units may set a y component of the IvDCShift to 0.

Meanwhile, when a motion vector is added to the merge candidate list based on inter-view prediction, the prediction units of the encoding and decoding devices may derive a candidate based on information on a depth map.

For example, the prediction units may apply motion parameter inheritance (MPI) which employs motion information from a video signal based on similarity between the video signal and a depth signal. In this case, different motion vectors by sub-PUs partitioned from one depth PU may be inherited from a texture. When the current block is a block of the depth map and MPI is applied, the prediction units may add, as merge candidates, a merge candidate T using a motion vector inherited from the texture and a depth candidate D derived based on T. When D is used, prediction samples may be set as depth values derived from corresponding disparity vectors.

Finally, the prediction units of the encoding and decoding devices may add a disparity vector by VSP as a merge candidate VSP. The prediction units may add a disparity vector of a neighbor block as a merge candidate for the current block and derive depth information on the current block based on a depth value of a corresponding block specified on the depth map by using this disparity vector.

The prediction units of the encoding and decoding devices may construct a merge candidate list using the aforementioned merge candidates as follows. The merge candidates may be disposed in the merge candidate list according to the following order.

(1) The prediction units add T and D to the merge candidate list as MPI candidates. Specifically, the prediction units determine whether T is available, and add T if available. The prediction units determines whether D is available, and add D if available.

(2) The prediction units inserts IvMC next to D in the merge candidate list when IvMC is available, that is, when T is unavailable or T and IvMC are different.

(3) The prediction units adds A1 to the merge candidate list if A1 is available. To prevent duplication of merge candidates, the prediction units may compare an already added merge candidate and A1 in terms of equivalence. The already added merge candidate N may be T, if a depth is used, and be IvMC, if no depth is used. The prediction units may exclude A1 from the merge candidates when A1 and N are the same.

(4) The prediction units adds B1 to the merge candidate list if B1 is available. To prevent duplication of merge candidates, the prediction units may exclude B1 from the merge candidates when B1 is the same as an already added candidate.

(5) The prediction units may add B0 to the merge candidate list if B0 is available.

(6) The prediction units may add IvDC to the merge candidate list if IvDC is available. Here, to improve encoding efficiency and avoid redundancy, the prediction units may add IvMC to the merge candidate list (i) when A1 is unavailable or A1 and IvDC are different, (ii) when B1 is unavailable or B1 and IvDC are different, and (iii) the number of merge candidates added so far does not exceed a maximum number of candidates in the merge candidate list.

(7) The prediction units may add the VSP-derived disparity vector (hereinafter, "VSP") to the merge candidate list when VSP is available and the number of merge candidates added so far does not exceed the maximum number of candidates in the merge candidate list. In this case, to improve encoding efficiency, the prediction units may add VSP to the merge candidate list on a condition that additional coding methods, for example, illumination compensation (IC), are not used. Thus, when an additional coding method including IC is used, VSP may be excluded from the merge candidates, which will be described below.

(8) The prediction units may add A0 to the merge candidate list when A0 is available and the number of merge candidates added so far does not exceed the maximum number of candidates in the merge candidate list.

(9) The prediction units may add B2 to the merge candidate list when B2 is available and the number of merge candidates added so far does not exceed the maximum number of candidates in the merge candidate list.

(10) The prediction units may add IvMCShift to the merge candidate list (a) when IvMCShift is available and the number of merge candidates added so far does not exceed the maximum number of candidates in the merge candidate list and (b) when IvMC is unavailable or IvMC and IvMCShift are not the same.

(11) The prediction units may add IvDCShift to the merge candidate list when IvDCShift is available and the number of merge candidates added so far does not exceed the maximum number of candidates in the merge candidate list As described above, when a sample to predict through the merge mode relates to a depth, candidates T and D by MPI may be used. Otherwise, T and D may not be used.

Figure 8:
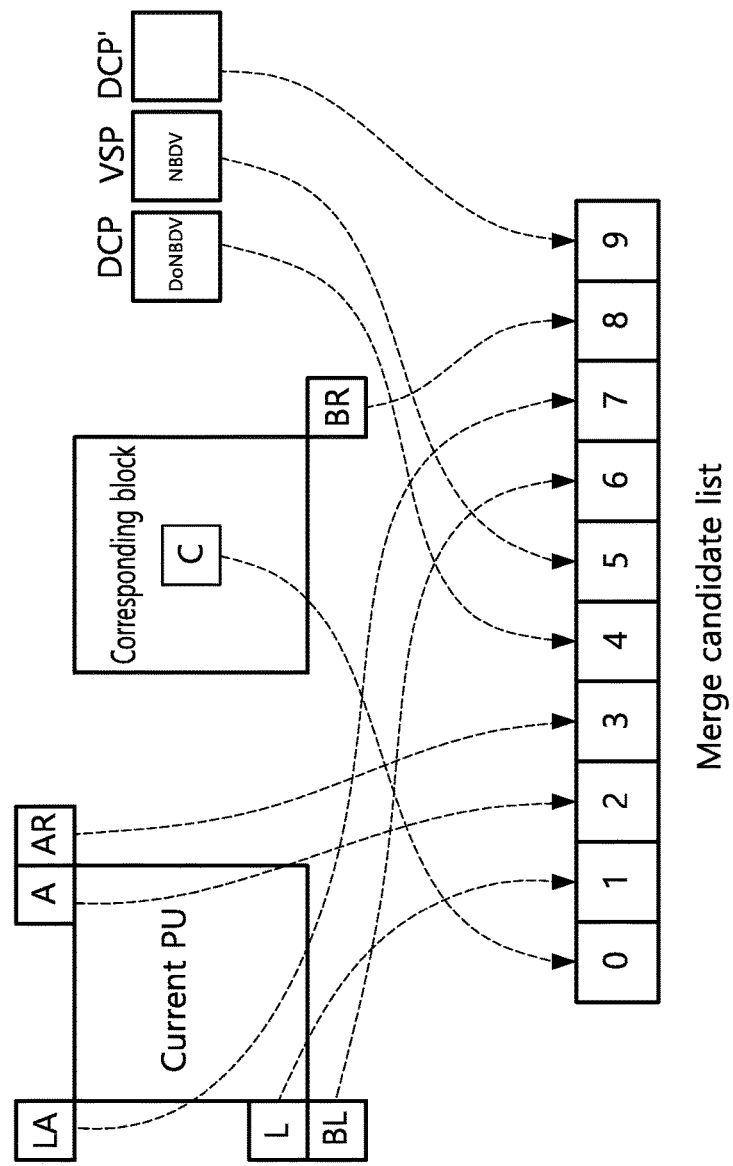
FIG. 8 schematically illustrates an example of constructing a merge candidate list.

FIG. 8 schematically illustrates an example of constructing a merge candidate list.

FIG. 8 schematically illustrates a method of constructing a merge candidate list when T and D are not used. Further, FIG. 8 illustrates an example of constructing a merge candidate list excluding a temporal candidate and a combined candidate.

Here, referring to FIG. 8, when the merge mode or skip mode is applied to a current PU to reconstruct, a merge candidate list may be constructed according to the following order. For convenience of description, it is illustrated that prediction units of encoding and decoding devices construct a merge candidate list.

(i) The prediction units may specify a corresponding block in a reference picture using a DoNBDV for a PU to reconstruct (hereinafter, "current PU"). The prediction units may obtain motion information from the corresponding block. For example, the prediction units may derive motion information on the corresponding block, as a merge candidate for the current PU, based on a central or left above sample of the corresponding block.

(ii) The prediction units may obtain motion information from a left position of the current PU. For example, the prediction units may derive motion information on a left block L shown in FIG. 8 as a merge candidate for the current PU.

(iii) The prediction units may obtain motion information from an above position of the current PU. For example, the prediction units may derive motion information on an above block A shown in FIG. 8 as a merge candidate for the current PU.

(iv) The prediction units obtain motion information from an above right position of the current PU. For example, the prediction units may derive motion information on an above right block AR shown in FIG. 8 as a merge candidate for the current PU.

(v) The prediction units may add a disparity vector derived based on a neighbor block of the current PU as a merge candidate. For example, the prediction units may add the DoNBDV for the current PU, that is, a disparity vector derived based on a neighbor block of the current PU and a depth map, to the merge candidate list as a merge candidate (motion information) for the current PU.

(vi) The prediction units may add a VSP for the current PU as a merge candidate. For example, the prediction units may add a disparity vector derived by applying VSP to the current PU (for example, NBDV) to the merge candidate list as a merge candidate (motion information) for the current PU.

(vii) The prediction units may obtain motion information from a bottom left position of the current PU. For example, the prediction units may derive motion information on a bottom left block BL shown in FIG. 8 as a merge candidate for the current PU.

(viii) The prediction units obtain motion information from a left above position of the current PU. For example, the prediction units may derive motion information on a left above block LA shown in FIG. 8 as a merge candidate for the current PU.

(ix) The prediction units may specify a block corresponding to the current PU in the reference picture by using a disparity vector and derive motion information from a bottom right position of the specified block. That is, the prediction units may shift an inter-view motion vector derived using the disparity vector and add the shifted vector as a merge candidate. The prediction units may use motion information derived from a bottom right block BR of the corresponding block shown in FIG. 8 as a merge candidate.

(x) The prediction units may use motion information obtained by modifying the disparity vector derived from the neighbor block of the current PU as a merge candidate. For example, the prediction units may shift the disparity vector of the current PU by a predetermine value to use the shifted disparity vector as a merge candidate.

Meanwhile, the shifted motion information and the shifted disparity information derived respectively in (ix) and (x) may correspond to IvMCShift and IvDCShift described above in (10) and (11).

Further, determination of equivalence between merge candidates applied above in (1) to (11) may also be applied to the example in FIG. 8. Thus, equivalency between pieces of motion information added to the merge candidate list in (i) to (x) and previously added merge candidates is determined, and merge candidates equivalent to those previously added may be excluded from the merge candidates.

Merge candidates based on inter-view prediction, for example, a candidate derived using a depth, a candidate of a disparity vector, and candidates derived using a disparity vector, may be included in the merge candidate list on the same conditions as described above in (1) to (11).

When the skip mode is applied, the current block may be a current CU, instead of the current PU.

As described above, when T and M are not used (when a PU to reconstruct is not a PU of a depth view), the prediction units may construct a merge candidate list by using motion information used for reconstructed blocks neighboring to the current PU and new motion information (motion information derived based on motion information on a neighbor block).

The motion information in (i) to (x) may include motion vectors, and motion information derived from a DCP block may include a disparity vector or employ a disparity vector as a merge candidate equally with a motion vector. Similarly, when MCP is applied to a reconstructed block neighboring to the current PU (in a case of an MCP block), MCP information (for example, a motion vector, a reference picture index, etc.) may be included as a merge candidate in the merge candidate list.

That is, the prediction units may obtain MCP, DCP, and VSP information from reconstructed neighbor blocks of the current PU to construct a merge candidate list.

In particular, to store motion information on a VSP, a VSP flag list may be used as additional information for the merge candidate list. When a reconstructed neighbor block is a VSP-applied block, a VSP flag value for the block may be saved as 1 in the VSP flag list. When a reconstructed neighbor block is a DCP or MCP-applied block, a VSP flag value for the block may be saved as 0 in the VSP flag list.

That is, this means that there may be a plurality of VSP, DCP, and MCP candidates in the merge candidate list, in which (v) and (x) among (i) to (x) are merge candidates derived by DCP.

Meanwhile, illumination compensation (IC) which calibrates an illumination difference between views may be applied to inter-view prediction. For example, since pictures taken by different cameras from different viewpoints at the same time are mutually referenced in coding an inter-view coding, an illumination difference may occur depending on camera conditions and photographing environments.

Thus, an illumination difference may be offset in a process of deriving a prediction sample by referencing a different view. IC may be applied in a linear compensation form, in which a sample value may be modified by using a weighting factor and offset derived based on a predetermined or signaled value.

However, when there is an insignificant difference in pixel distribution between a current picture and a reference picture or differences in photographing conditions between views or pictures do not significantly matter, IC may not be applied to avoid an increase in complexity and deterioration in coding efficiency which may be caused.

Thus, it is necessary to examine how to adjust merge candidate depending on whether IC is applied.

First, when IC is not applied to the PU to reconstruct (current block), motion information on reconstructed blocks neighboring to the current block may be added as they are to the merge candidate list as described above.

That is, as described above in (1) to (11) and (i) to (x), MCP, DCP, and VSP candidates may be added as they are to the merge candidate list.

When IC is applied to the PU to reconstruct (current block), motion information derived by VSP is excluded from the merge candidate list. For example, when IC is applied, a VSP for deriving a sample of a texture picture using a sample of a depth picture taken under similar conditions may be excluded from the merge candidates. Meanwhile, when the motion information derived from the reconstructed blocks neighboring to the current block is DCP or MCP, the derived MCP and DCP may be added to the merge candidate list in the same manner as when no IC is applied.

Thus, when IC is applied, the VSP merge candidate is excluded from the merge candidate list. When no IC is applied, the VSP merge candidate may be included in the merge candidate list as it is derived without modification. Considering this, it has been described in (7) that when an additional coding method, that is, IC, is applied, a VSP may be excluded from the merge candidates.

In addition, when constructing the merge candidate list, the prediction units of the encoding and decoding devices may save a VSP flag value as 0, if IC is applied, and add a disparity vector of a neighbor block derived in application of VSP to the merge candidate list as a DCP candidate.

Figure 9:
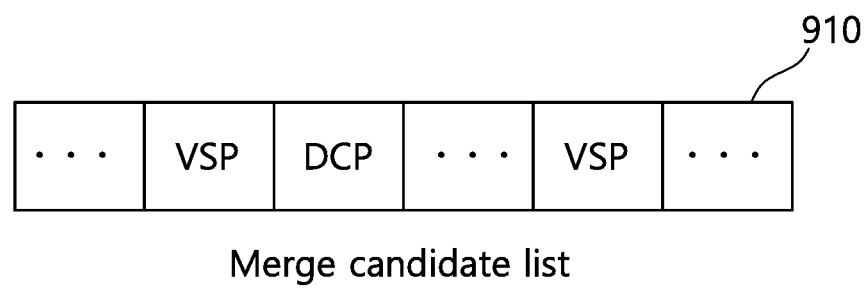
FIG. 9 schematically illustrates a method of constructing a merge candidate list when no illumination compensation (IC) is applied.

FIG. 9 schematically illustrates a method of constructing a merge candidate list when no IC is applied.

As described above, when no IC is applied, a VSP may be used as a merge candidate as it is derived. Thus, a VSP candidate may be included in a merge candidate list 910 if satisfying other conditions relating to availability.

Figure 10:
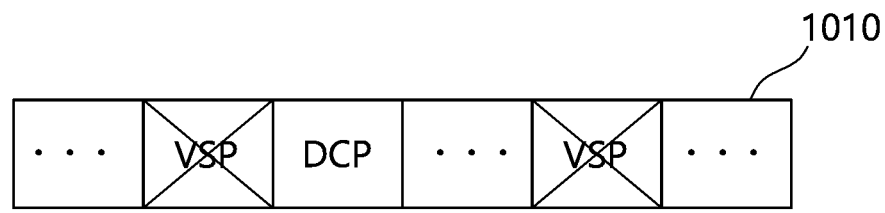
FIG. 10 schematically illustrates a method of constructing a merge candidate list when IC is applied.

FIG. 10 schematically illustrates a method of constructing a merge candidate list when IC is applied.

As described above, when IC is applied, a VSP is not used as a merge candidate. Thus, a VSP candidate is excluded from a merge candidate list 1010.

Figure 11:
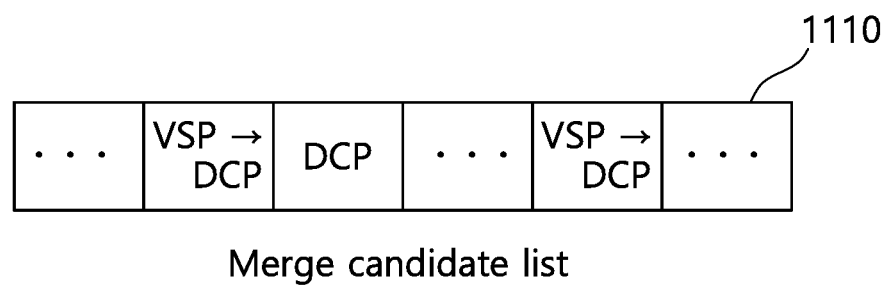
FIG. 11 schematically illustrates another method of constructing a merge candidate list when IC is applied.

FIG. 11 schematically illustrates another method of constructing a merge candidate list when IC is applied.

As described above, when IC is applied, a VSP is not used as a merge candidate. Here, a prediction unit constructing a merge candidate list may include a disparity vector derived in a VSP process as a DCP candidate, instead of a VSP candidate, in a merge candidate list 1110.

Although FIGS. 9 to 11 illustrate that the merge candidate lists are constructed by including a plurality of VSP candidates and a plurality of DCP candidates in random order, these examples are for convenience of description. Alternatively, the merge candidate lists in FIGS. 9 to 11 may be constructed according to (1) to (11) and (i) to (x).

As such, the prediction units of the encoding and decoding devices may determine whether to add a VSP candidate to a merge candidate list depending on whether IC is applied. When a VSP cannot be added, a VSP candidate is merely excluded from a merge candidate list or is regarded as a DCP candidate to be added to a merge candidate list.

The foregoing VSP candidate is inter-view prediction similar to conventional DCP. As described above, unlike DCP, VSP is performed with reference to a depth map. Here, the depth map for reference may be a depth map already decoded (reconstructed).

The depth map for reference (reconstructed depth map) may be a depth map in a neighbor view having the same POC as the current picture or be a previously reconstructed depth map in the current view.

For convenience of description, it is illustrated below that VSP is performed by the prediction units of the encoding and decoding devices. When VSP is applied to the PU to reconstruct (current block), the prediction units specify a depth block corresponding to the current block first. The prediction units may use a motion vector or disparity vector to specify the depth block. Here, the used disparity vector or motion vector may be a disparity vector or motion vector of a neighbor block.

Figure 12:
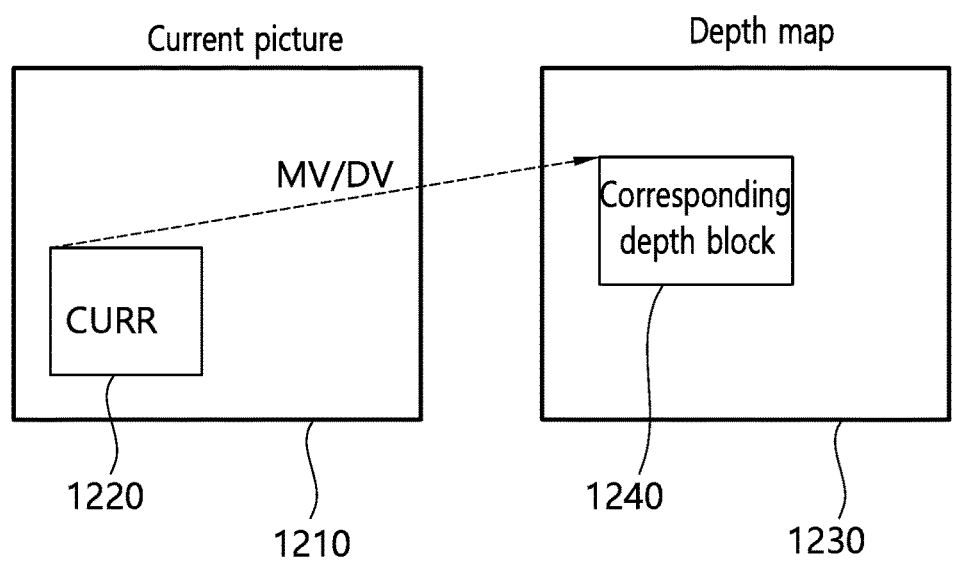
FIG. 12 schematically illustrates a method of specifying a corresponding depth block in order to apply view synthesis prediction (VSP) to a current block.

FIG. 12 schematically illustrates a method of specifying a corresponding depth block in order to apply VSP to a current block.

Referring to FIG. 12, a corresponding block 1240 to a current block 1220 in a current picture 1210 is specified in a depth map 1230. Here, the current picture 1210 is a texture picture in a current view. The current picture 1210 and the depth map 1230 may be pictures at the same time (with the same POC). The depth map 1230 referenced by the current block 1220 is a picture completely coded or reconstructed at a time when the current block is coded.

A prediction unit may generate a virtual prediction block through warping using information on the depth block 1240 specified by a motion vector or disparity vector in the depth map 1230. Alternatively, the prediction unit may perform DCP on the current block by using a disparity vector converted from a depth value of the depth block 1240.

To specify the depth block 1240, the prediction unit may use a motion vector, if the depth map 1230 is a picture in the same view, and use a disparity vector, if the depth map 1230 is a picture of a different view. Here, the disparity vector may be derived from a neighbor block of the current block.

As described above, to perform prediction using VSP, inter-view prediction may be performed by referencing the depth value of the depth block corresponding to the current block. Here, the current block (current prediction block) may be partitioned into specific blocks, and prediction units of encoding and decoding devices may perform inter-view prediction as follows.

1) The prediction units partition the current prediction block (current PU) into specific blocks (sub-prediction blocks).

2) The prediction units may perform the following processes 2-A to 2-D by partitioned sub-prediction blocks.

2-A) The prediction units may specify a depth block corresponding to each sub-prediction block. Here, the prediction units may use a disparity vector specifying the depth block corresponding to the current prediction block and a position specifying each sub-prediction block with respect to current prediction to specify the depth block corresponding to each sub-prediction block.

2-B) The prediction units may extract a representative depth value from the depth block corresponding to the sub-prediction block.

2-C) The prediction units may convert the representative depth value into a disparity vector.

2-D) The prediction units may perform DCP by sub-prediction block using the disparity vector.

As such, the prediction units may partition the prediction block into specific blocks (sub-prediction blocks) to apply DCP.

Figure 13:
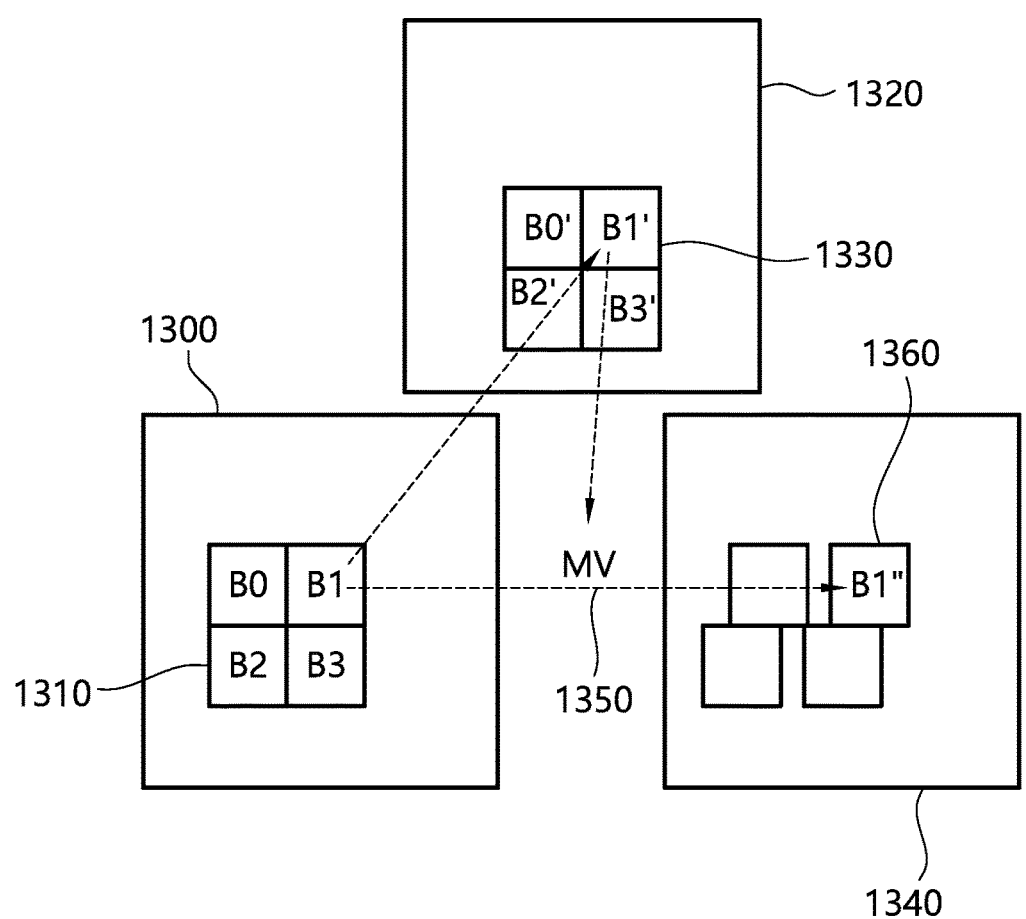
FIG. 13 schematically illustrates a method of performing disparity-compensated prediction (DCP) by sub-block by applying VSP.

FIG. 13 schematically illustrates a method of performing DCP by sub-block by applying VSP.

Referring to FIG. 13, prediction units of encoding and decoding devices may partition a current PU 1310 in a texture picture 1300 of a current view into sub-blocks (sub-prediction blocks) B0, B1, B2, and B3.

The prediction units may specify a corresponding depth block 1330 in a depth picture 1320 through a disparity vector. Here, the disparity vector may be derived from a neighbor block (for example, a DCP block) of the current PU.

The prediction units may partition and specify the corresponding depth block 1330 into sub-depth blocks B0', B1', B2', and B3' corresponding to the sub-prediction blocks B0, B1, B2, and B3. The prediction units may derive depth values (representative depth values) of the sub-depth blocks. The prediction units may convert the depth values of the sub-depth blocks to derive disparity vectors for the respective sub-prediction blocks.

For example, for a sub-prediction block B1, the prediction units may specify a corresponding depth block B' and derive a disparity vector MV 1350 based on a depth value of B1'.

The prediction units may perform DCP by sub-prediction block using the derived disparity vectors. For example, the prediction units may specify a reference block B1" 1360 in a reference picture 1340 using the disparity vector MV 1350 derived for the sub-prediction block B1 and use a sample of B" 1360 as a prediction sample for the sub-prediction block B1.

As described above, VSP may be performed by partitioning a current PU into specific sub-PUs, in which a current PU is partitioned into sub-PUs by an illustrative method as follows.

A) First, the prediction units of the encoding and decoding devices may partition a PU to reconstruct (target PU or current PU) into 8×8 pixel block units (that is, 8×8 sub-PUs).

B) The prediction units may perform the following processes B-1 to B-4 by 8×8 pixel block units.

B-1) The prediction units may specify a depth block corresponding to the 8×8 pixel blocks. Here, the prediction units may specify a depth block corresponding to each of the 8×8 blocks (sub-PUs) using a disparity vector specifying a depth block corresponding to the current PU and a size of the sub-PUs (8×8).

B-2) The prediction units may compare depth values at four vertices of the depth blocks corresponding to the 8×8 blocks.

B-3) The prediction units may further partition the 8×8 blocks into two 8×4 sub-blocks or two 4×8 sub-blocks through comparison of the depth values of the vertices.

B-4) The prediction units may perform the following processes B-4-1 to B-4-4 on the further partitioned 8×4 sub-blocks or 4×8 sub-blocks.

B-4-1) The prediction units may specify a block in a depth map (depth block) corresponding to the sub-blocks (8×4 sub-blocks or 4×8 sub-blocks).

B-4-2) The prediction units may extract a depth value (representative depth value) of the depth block corresponding to the sub-blocks.

B-4-3) The prediction units may convert the extracted representative depth value into a disparity vector.

B-4-4) The prediction units may perform DCP by sub-blocks (8×4 sub-blocks or 4×8 sub-blocks) using the disparity vector obtained from the representative depth value.

As such, the prediction units may re-partition the PU to reconstruct (current PU) into the sub-blocks (8×4 sub-blocks or 4×8 sub-blocks) from a basic unit of 8×8 blocks and perform DCP by sub-blocks.

Figure 14:
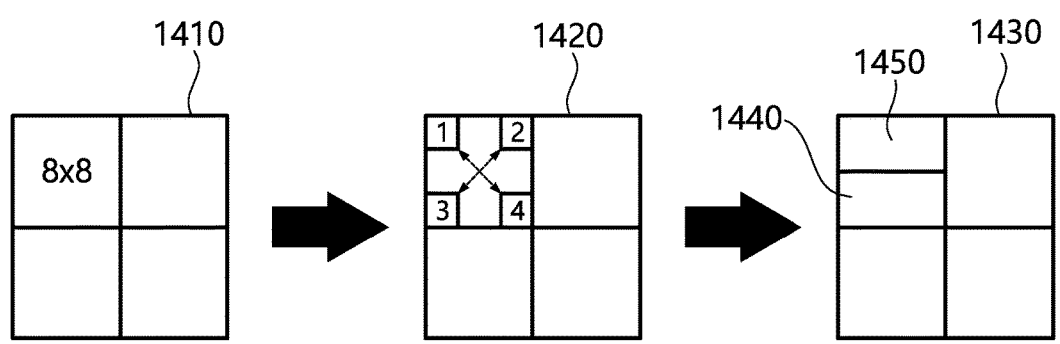
FIG. 14 schematically illustrates another method of performing DCP by sub-block by applying VSP.

FIG. 14 schematically illustrates another method of performing DCP by sub-block by applying VSP. FIG. 14 schematically illustrates an example of VSP described above in A) to B).

Referring to FIG. 14, prediction units of the encoding and decoding devices may partition a current PU 1410 into 8×8 block units.

The prediction units may specify a depth block 1420 corresponding to the current PU 1410. Here, the depth block 1420 may be specified using a disparity vector derived from a neighbor block of the current PU 1410.

The prediction units may specify depth blocks (sub-depth blocks) corresponding to 8×8 blocks in the current PU.

The prediction units may specify an addition partition form using depth values of four vertices (vertex 1, vertex 2, vertex 3, and vertex 4) of the sub-depth blocks. For example, the prediction units may determine the additional partition form for the 8×8 blocks according to Table 1.

TABLE 1

If (depth[1] < depth[4] ^ (depth[2] < depth[3]), use 8 × 4 sub-blocks.
Otherwise, use 4 × 8 sub-blocks.

Referring to Table 1, a partition direction for sub-blocks may be determined by comparing depth values of two vertices diagonally facing each other.

For example, referring to FIG. 14, when a depth value of vertex 1 (depth[1]) in the corresponding depth blocks is smaller than a depth value of vertex 4 (depth[4]) and a depth value of vertex 2 (depth[2]) is smaller than a depth value of vertex 3 (depth[3]), the 8×8 blocks of the current PU may be partitioned into two sub-blocks (8×4 blocks) in the horizontal direction. Further, the depth value of vertex 1 (depth[1]) in the corresponding depth blocks is greater than the depth value of vertex 4 (depth[4]) and the depth value of vertex 2 (depth[2]) is greater than the depth value of vertex 3 (depth[3]), the 8×8 blocks of the current PU may also be partitioned into two sub-blocks (8×4 blocks) in the horizontal direction. In other cases than the above two cases, the 8×8 blocks of the current PU may be partitioned into two sub-blocks (4×8 blocks) in the vertical direction.

Referring back to FIG. 14, the 8×8 blocks of the current PU 1430 may be partitioned in the horizontal direction or vertical direction. FIG. 14 illustrates that the current PU 1430 is partitioned into two 8×4 blocks 1440 and 1450 in the horizontal direction.

Meanwhile, there may be considered another method of defining a PU to reconstruct (current PU) by particular block unit. Specifically, the prediction units of the encoding and decoding devices may compare depth values in a depth block corresponding to four corners of the current PU to determine a partition form for sub-PUs before partitioning the current PU into 8×8 blocks.

In this case, the prediction units may perform VSP on the current PU as follows.

a) The prediction units may compare depth values at four corners of a depth block corresponding to a current PU. The prediction units may specify the depth block corresponding to the current PU using a disparity vector derived from a neighbor block of the current PU.

b) The prediction units may uniformly partition the current PU into 8×4 sub-blocks or 4×8 sub-blocks through comparison of the depth values. For example, in a first case where a depth value at an above left corner in the depth block corresponding to the current PU is smaller than a depth value at a bottom right corner and a depth value at an above right corner is smaller than a depth value at a bottom left corner and in a second case where the depth value at the above left corner is greater than the depth value at the bottom right corner and the depth value at the above right corner is greater than the depth value at the bottom left corner, the prediction units may partition the current PU into 8×4 sub-blocks (sub-PUs). In other cases than the first case and the second case as a result of comparison of the depth values at the four corners of the depth block, the prediction units may partition the current PU into 4×8 sub-blocks (sub-PUs).

c) The prediction units may perform the following processes c-1 to c-3 by partitioned sub-block.

c-1) The prediction units may specify a depth block corresponding to the sub-blocks. Here, the prediction units may specify a depth block corresponding to each sub-block (sub-PU) in the depth block corresponding to the current PU using a size of the sub-blocks (4×8 or 8×4).

c-2) The prediction units may convert a depth value of the depth block corresponding to each sub-block into a disparity vector. The prediction units may specify a representative depth value of the depth block corresponding to each sub-block and derive a disparity vector using the representative depth value.

c-3) The prediction units may perform DCP by sub-block using the derived disparity vector. For example, the prediction units may derive a prediction sample of a current sub-PU using a sample of a reference block, specified by a disparity vector derived by sub-block, in a reference view of the current PU. Here, the reference block may be a picture having the same PU as the current PU in the reference view of the current PU.

Figure 15:
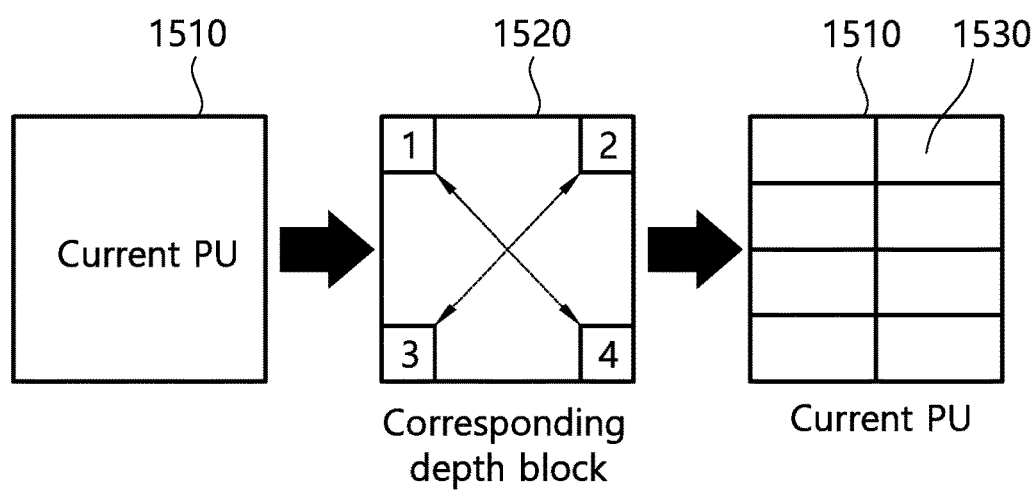
FIG. 15 schematically illustrates still another method of performing DCP by sub-block by applying VSP.

FIG. 15 schematically illustrates still another method of performing DCP by sub-block by applying VSP. FIG. 15 schematically illustrates an example of VSP described above in a) to c).

Referring to FIG. 15, prediction units of the encoding and decoding devices may specify a depth block 1520 corresponding to a current PU 1510.

The prediction units may specify the depth block 1520 corresponding to the current PU 1510 in a depth map. Here, the depth block 1520 may be specified using a disparity vector derived from a neighbor block of the current PU 1510.

The prediction units may specify a sub-block partition form using depth values of four corner samples (corner sample 1, corner sample 2, corner sample 3, corner sample vertex 4) of the depth block 1520. For example, the prediction units may determine the sub-block partition form according to Table 2.

TABLE 2

If (depth[1] < depth[4] ^ (depth[2] < depth[3]), use 8 × 4 sub-blocks.
Otherwise, use 4 × 8 sub-blocks.

Referring to Table 2, a partition direction for the current PU may be determined by comparing depth values of two corner samples diagonally facing each other in the depth block.

For example, referring to FIG. 15, when a depth value of corner sample 1 (depth[1]) in the depth block 1520 is smaller than a depth value of corner sample 4 (depth[4]) and a depth value of corner sample 2 (depth[2]) is smaller than a depth value of corner sample 3 (depth[3]), as shown, the current PU 1510 may be partitioned into sub-blocks 1530 in the horizontal direction, that is, 8×4 sub-blocks 1530. Further, the depth value of corner sample 1 (depth[1]) in the depth block 1520 is greater than the depth value of corner sample 4 (depth[4]) and the depth value of corner sample 2 (depth[2]) is greater than the depth value of corner sample 3 (depth[3]), as shown, the current PU 1510 may also be partitioned into sub-blocks 1530 in the horizontal direction, that is, 8×4 sub-blocks 1530. In other cases than the above two cases, although not shown, the current PU may be partitioned into sub-blocks in the vertical direction, that is, 4×8 sub-blocks.

Figure 16:
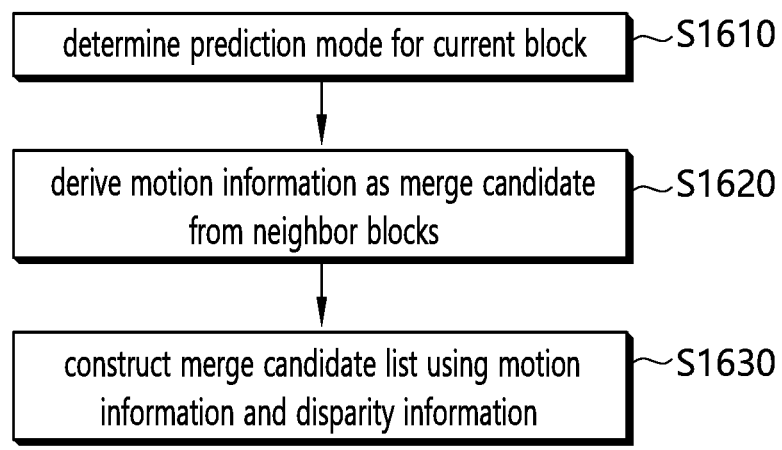
FIG. 16 is a flowchart schematically illustrating a method of constructing a merge candidate list according to the present invention.

FIG. 16 is a flowchart schematically illustrating a method of constructing a merge candidate list according to the present invention. The method in FIG. 16 may be performed by encoding and decoding devices, in which it is illustrated that the method is performed by prediction units of the encoding and decoding devices for convenience of description.

Referring to FIG. 16, the prediction units may determine a prediction mode for a current block (S1610). The prediction units may determine whether to apply intra prediction or inter prediction to the current block, and determine whether to apply the skip mode, the merge mode, or the motion vector prediction mode if inter prediction is applied.

In the case of the decoding device, a prediction mode for the current block may be determined based on information signaled from the encoding device.

As a result of determining a prediction mode for the current block, when the merge mode or skip mode is applied to the current block, the prediction units may derive motion information from neighbor blocks as a merge candidate (S1620). The motion information includes a motion vector and a reference picture index.

Here, the derived motion information may be the same as spatial candidates forming a merge candidate list when the merge mode is applied to a base view. In constructing a merge candidate list described above, the motion information as a merge candidate is the same as A1, B1, B0, A0, and B2 in FIG. 7.

The prediction units may construct a merge candidate list using the motion information and disparity information (S1630). As described above, the motion information includes a motion vector and a reference picture index, and the disparity information may include a disparity vector and a reference view index. The disparity vector may be derived using information on a neighbor block and/or depth information and be a shifted value if necessary.

Specific methods of constructing merge candidates and a merge candidate list have been described above.

Figure 17:
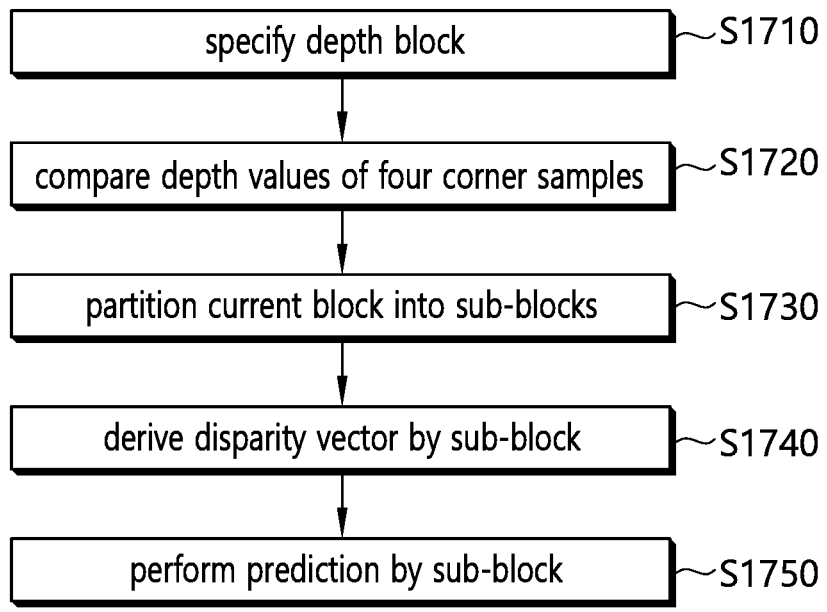
FIG. 17 is a flowchart schematically illustrating a method of performing VSP according to the present invention.

FIG. 17 is a flowchart schematically illustrating a method of performing VSP according to the present invention. The method in FIG. 17 may be performed by encoding and decoding devices, in which it is illustrated that the method is performed by prediction units of the encoding and decoding devices for convenience of description.

Referring to FIG. 17, the prediction units may specify a depth block corresponding to a current block (S1710). The current block may be a prediction block, and the corresponding depth block may be specified on a depth map (depth picture) using a derived disparity vector. Here, the disparity vector used to specify the depth block may be derived using information on a neighbor block of the current block. Further, the depth map may be a previously coded (encoded/decoded) picture in the same view as a current picture including the current block or a depth picture having the same POC as the current picture in a different view. A POC is a value specifying a picture output order.

The prediction units may compare values of four corner samples in the corresponding depth block (S1720). The prediction units may compare values of an above left corner sample, a bottom left corner sample, an above right corner sample, and a bottom right corner sample of the depth block.

The prediction units may partition the current block into sub-blocks using a result of comparing the corner samples of the depth block (S1730). In a (first) case where a depth value of the above left corner sample is smaller than a depth value of the bottom right corner sample and a depth value of the above right corner sample is smaller than a depth value of the bottom left corner sample, the prediction units may partition the current block into sub-blocks in the horizontal direction. In a (second) case where the depth value of the above left corner sample is greater than the depth value of the bottom right corner sample and the depth value of the above right corner sample is greater than the depth value of the bottom left corner sample, the prediction units may partition the current block into sub-blocks in the horizontal direction. In other cases than the first case and the second case, the prediction units may partition the current block into sub-blocks in the vertical direction.

Here, the sub-blocks in the horizontal direction may be 8×4 sub-PUs, and the sub-blocks in the vertical direction may be 4×8 sub-PUs.

The prediction units may derive a disparity vector by sub-block (S1740). The disparity vector may be derived using a depth value and a camera parameter. The prediction units may specify a depth block corresponding to each sub-block to derive a disparity vector for each sub-block using a depth value of the depth block.

The prediction units may perform prediction by sub-block of the current block (S1750). For example, the prediction units may perform DCP on each sub-block using the disparity vector derived by sub-block.

Specific VSP methods and specific methods of decoding a current block using VSP have been described above.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

The invention claimed is:

1. A method of constructing a merge candidate list in coding a multi-view video, the method comprising:
   determining a prediction mode for a current block;
   deriving, as a merge candidate, motion information from neighbor blocks of the current block when the prediction mode for the current block is a merge mode or a skip mode; and
   constructing a merge candidate list using the motion information of the neighbor blocks and disparity information derived from a neighbor block of the current block,
   wherein the constructing of the merge candidate list arranges merge candidates in order of first disparity information derived from the neighbor block of the current block, motion information derived from a left block of the current block, motion information derived from an above block of the current block, motion information derived from an above right block of the current block, second disparity information derived using depth information based on the first disparity information, third disparity information derived based on view synthesis, motion information derived from a bottom left block of the current block, and motion information derived from a left above block of the current block,
   wherein the current block is partitioned into sub-blocks based on depth values of four corner samples of a depth block corresponding to the current block,
   wherein the third disparity information represents disparity information for each sub-block,
   wherein the disparity information for the each sub-block is derived based on depth blocks corresponding to the sub-blocks, and
   wherein a size of the each sub-block is determined by comparing the depth values of the four corner samples of the depth block in a diagonal direction.

2. The method of claim 1, wherein the constructing of the merge candidate list comprises determining whether illumination compensation is applied to the current block, and excluding the third disparity information based on view synthesis from the merge candidate list when illumination compensation is applied to the current block.

3. The method of claim 1, wherein the constructing of the merge candidate list comprises determining whether illumination compensation is applied to the current block, and adding the third disparity information based on view synthesis to the merge candidate list as disparity information for disparity-compensated prediction when illumination compensation is applied to the current block.

4. The method of claim 1, wherein the constructing of the merge candidate list determines availability of merge candidates comprised in the merge candidate list, and modifies at least one of the first disparity information and the second disparity information to add the one to the merge candidate list when a number of available merge candidates is greater a maximum number of candidates in the merge candidate list.

5. The method of claim 1, wherein the four corner samples are a first sample as an above left corner sample of the depth block corresponding to the current block, a second sample as an above right corner sample, a third sample as a bottom left corner sample, and a fourth sample as a bottom right corner sample, and
   wherein when a depth value of the first sample is smaller than a depth value of the fourth sample and a depth value of the second sample is smaller than a depth value of the third sample, the sub-blocks of the current block are 8×4 sub-blocks.

6. A method of decoding a video which decodes a multi-view video by sub-block of a prediction block, the method comprising:
   specifying a depth block corresponding to a current prediction block;
   partitioning the current prediction block into sub-blocks based on depth values of four corner samples of the depth block;
   deriving a disparity vector for each sub-block based on depth blocks corresponding to the sub-blocks; and
   deriving a prediction sample of the each sub-block based on the disparity vector for the each sub-block,
   wherein the partitioning of the current prediction block comprises determining a size of the each sub-block by comparing the depth values of the four corner samples of the depth block in a diagonal direction.

7. The method of claim 6, wherein the depth block is a block in a depth picture which has the same picture order count (POC) as a picture comprising the current prediction block.

8. The method of claim 6, wherein the four corner samples are a first sample as an above left corner sample of the depth block, a second sample as an above right corner sample, a third sample as a bottom left corner sample, and a fourth sample as a bottom right corner sample, and
   wherein in a first case where a depth value of the first sample is smaller than a depth value of the fourth sample and a depth value of the second sample is smaller than a depth value of the third sample and in a second case where the depth value of the first sample is greater than the depth value of the fourth sample and the depth value of the second sample is greater than the depth value of the third sample, the current prediction block is partitioned into the sub-blocks in a horizontal direction.

9. The method of claim 8, wherein in other cases than the first case and the second case, the current prediction block is partitioned into the sub-blocks in a vertical direction.

10. The method of claim 6, wherein the sub-block is any one of a 4×8 sub-block or 8×4 sub-block.

11. The method of claim 6, wherein the four corner samples are a first sample as an above left corner sample of the depth block, a second sample as an above right corner sample, a third sample as a bottom left corner sample, and a fourth sample as a bottom right corner sample, and wherein in a first case where a depth value of the first sample is smaller than a depth value of the fourth sample and a depth value of the second sample is smaller than a depth value of the third sample and in a second case where the depth value of the first sample is greater than the depth value of the fourth sample and the depth value of the second sample is greater than the depth value of the third sample, the current prediction block is partitioned into 8×4 sub-blocks, and in other cases than the first case and the second case, the current prediction block is partitioned into 4×8 sub-blocks.

* * * * *